No. 808,159. PATENTED DEC. 26, 1905.
B. A. KARR.
ELECTRIC SIGNAL FOR RAILWAYS.
APPLICATION FILED AUG. 28, 1905.
3 SHEETS—SHEET 1.
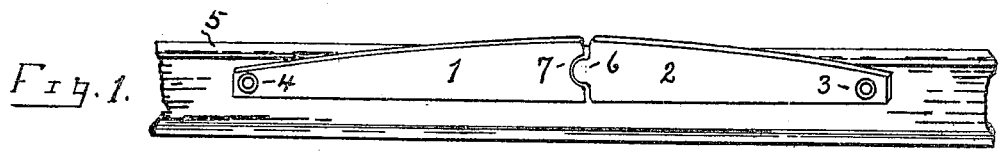
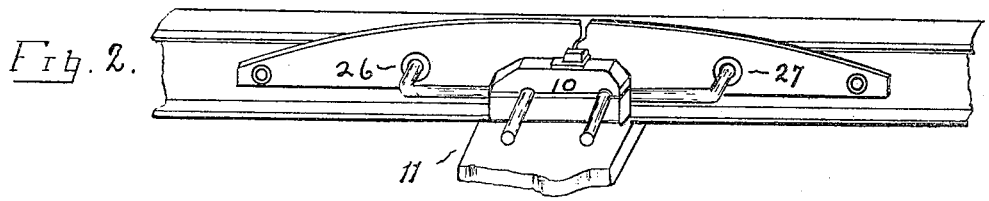
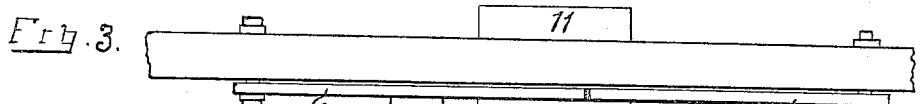
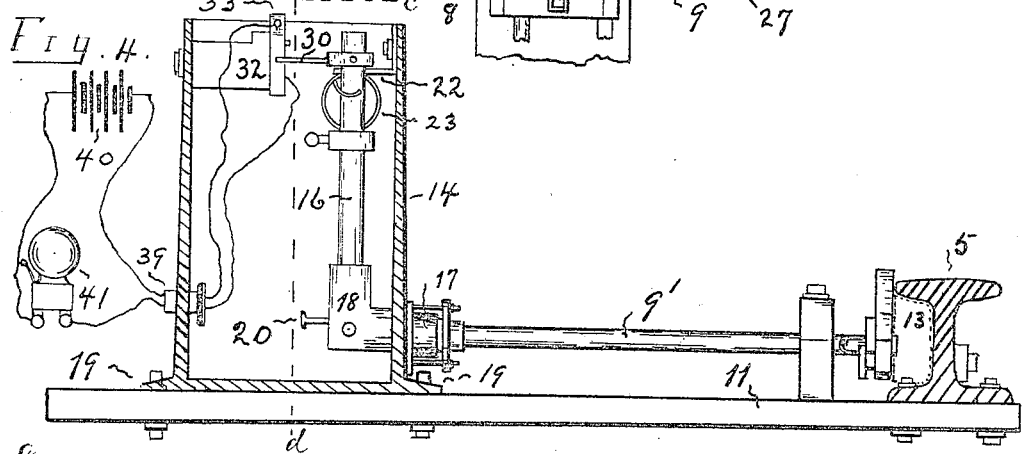
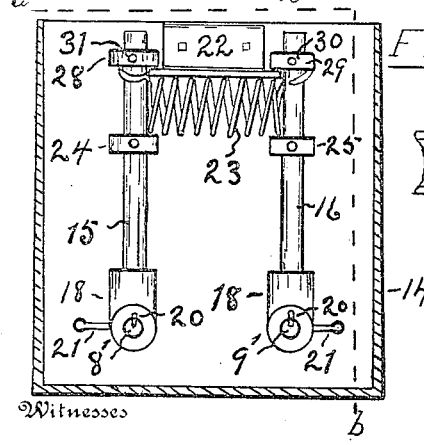
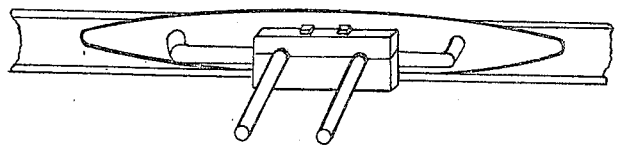
Burton A. Karr, Inventor
By Hiram A. Sturges, Attorney

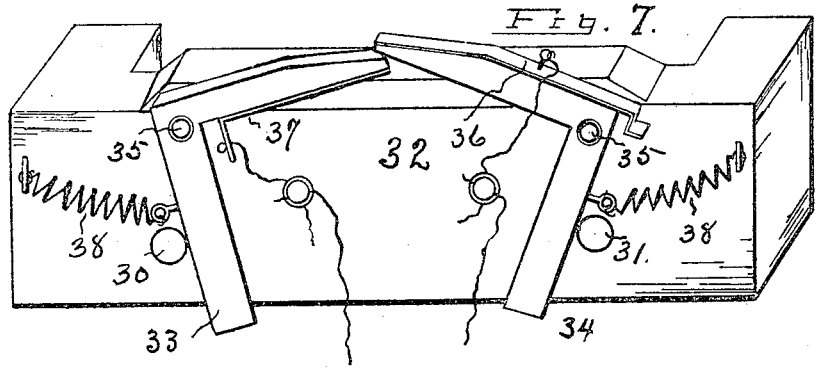
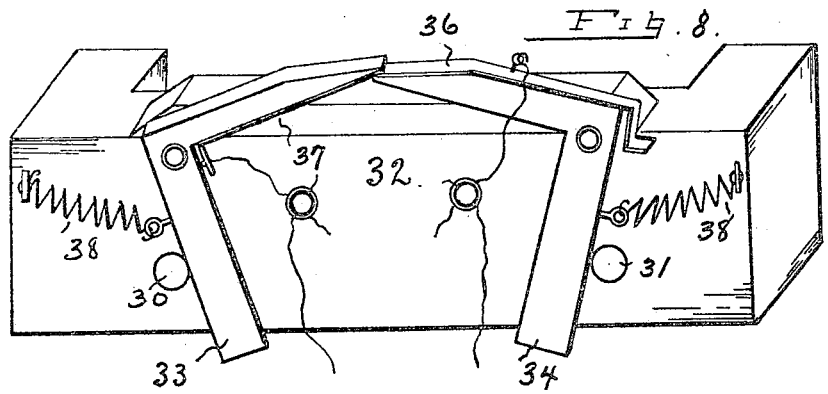
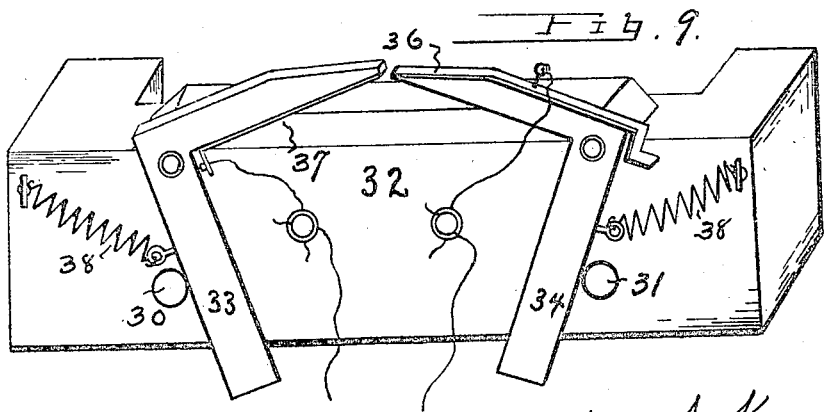

No. 808,159. PATENTED DEC. 26, 1905.
B. A. KARR.
ELECTRIC SIGNAL FOR RAILWAYS.
APPLICATION FILED AUG. 8, 1888.
3 SHEETS—SHEET 3.
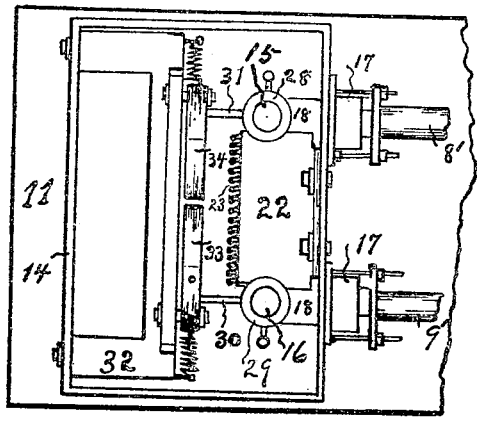
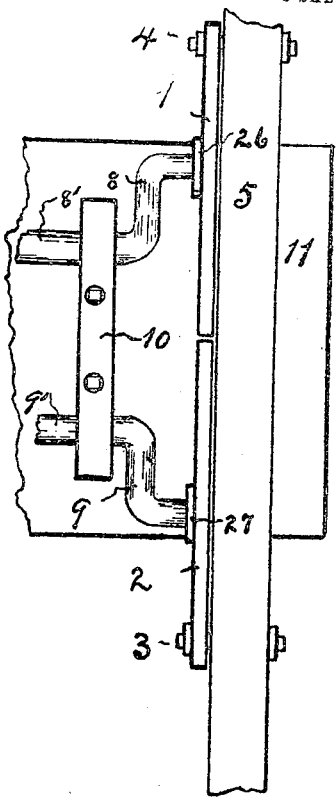
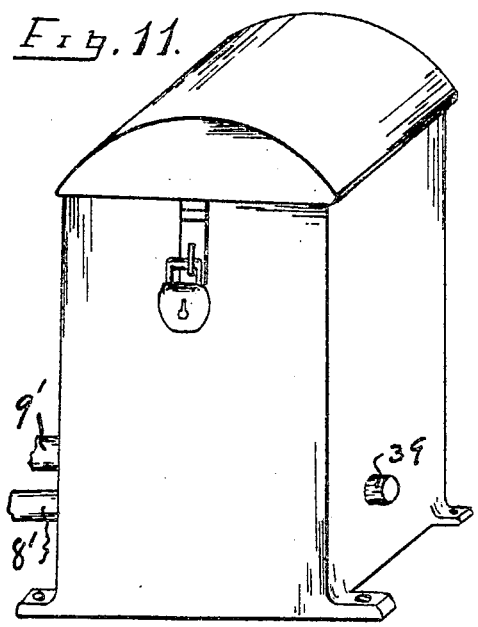
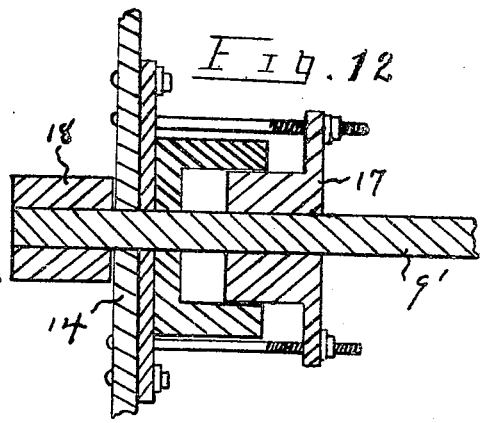
Witnesses
J. W. Martin
J. A. Broadwell
Inventor
Buston A. Karr
By Hiram A. Sturges
Attorney

UNITED STATES PATENT OFFICE.

BURTON A. KARR, OF OMAHA, NEBRASKA.

ELECTRIC SIGNAL FOR RAILWAYS.

No. 808,159. Specification of Letters Patent. Patented Dec. 26, 1905.

Application filed August 28, 1905. Serial No. 276,062.

*To all whom it may concern:*

Be it known that I, BURTON A. KARR, a citizen of the United States, residing at Omaha, in the county of Douglas and State of Nebraska, have invented certain new and useful Improvements in Electric Signals for Railways, of which the following is a specification.

My invention relates to improvements in electric signals for railways for indicating the approach of trains; and the object of my invention is to present mechanism which will be efficient in action and convenient for making connection to the track at any point.

The invention refers particularly to a construction adapted to withstand a high degree of vibration without wearing or loosening the parts and adapted to be employed while immersed in water and upon low grounds subject to water overflow.

With these and other objects in view the invention presents a novel construction and arrangement of parts, as described herein and as illustrated by the drawings, wherein—

Figures 1 and 2 represent perspective views, and Fig. 3 represents a top view illustrating construction and mounting of rock-bars on a railway track-rail. Fig. 4 represents a vertical side elevation of the invention, parts thereof being in section to illustrate interior mechanism. Fig. 5 represents a view of certain devices within the compartment on the line *b c* of Fig. 4, the walls of the compartment being in section. Fig. 6 represents a modification of my invention in the matter of rock-bars, being constructed as a unit, more fully explained hereinafter. Figs. 7, 8, and 9 are perspective views of contacting levers and manner of mounting the same. Fig. 10 represents a top view of my complete invention. Fig. 11 represents a perspective view of the receptacle containing certain of the devices employed and shows the receptacle-cover. Fig. 12 represents a sectional top view of packing-boxes 17.

I employ the rock-bars 1 and 2 and pivotally mount them, as at 3 and 4, upon a car-rail 5, rock-bar 2 being provided with the lug 6 at its free end. The lug 6 is adapted to have a mounting within the recess 7 of rock-bar 1, the recess 7 being formed with a larger circular opening or space than is occupied by lug 6. In order that one of the rock-bars while in operation may be actuated previously to the other, I provide the horizontally-disposed and angularly-formed arms 8 and 9, pivotally mounted, respectively, upon the rock-bars 1 and 2, as at 26 and 27, these details being shown in Figs. 1, 2, and 3 of the drawings, and since Figs. 1 and 2 represent identical rock-bars, these figures may be considered together as to the use of numerals, the sole purpose of Fig. 1 being to illustrate the lower portion of recess 7.

I employ the block 10, through which arms 8 and 9 pass, this block being made rigid with the base-piece 11. The base 11 preferably extends beneath the rail to which it is conveniently made rigid, as by bolting or otherwise, and I employ the block 13 to fill the space between the pivotal mounting of the rock-bars 1 and 2 with the track-rail to secure a firm support.

I construct a box or receptacle (illustrated by Fig. 11) the walls thereof being represented by the numeral 14, and for this receptacle any kind of metal may be used, though its four angular side walls and bottom are preferably cast integral, and at one lower side I provide suitable openings to allow the passage therethrough of arms 8' and 9', these arms being a continuation of arms 8 and 9. I rigidly mount the receptacle upon the base 11 by means of suitable foot-pieces 19, near to and in a manner facing the railway-track, so that the arms, uniformly spaced, will extend at substantially a right angle from the track and make an entrance within the receptacle through the openings mentioned. In order that no water may come within the receptacle, the tube-opening 39, through which electrically-energized wiring passes, is closed in any suitable manner, as with cement, after the wires have been placed in position. The cap may be placed upon the receptacle also in any suitable manner, so that water may not come within the compartment at the top, and the receptacle may be built with walls of any height. Since the arms 8' and 9' must rotate within their respective openings in the walls of the receptacle, I provide packing-boxes 17, suitably positioned upon the outside of the receptacle, through which these arms pass, and upon the inner wall of the receptacle opposite each packing-box I employ elbow-formed sleeves 18, one part thereof extending horizontally and the other part being disposed vertically. The arms 8' and 9', respectively, terminate within the horizontal portion of these sleeves and are held rigid therewith by means of the friction-pins 20 and the set-screws 21. I provide levers 15 and 16 within the receptacle, they being vertically disposed when in their normal position, and they have thread-and-groove mounting within the vertical portions of sleeves 18. Rigidly mounted upon the inner wall of the receptacle is the bracket 22, the lower angular portion thereof extending horizontally from the wall in a manner to form a shelf between the levers 15 and 16, near the upper ends of the latter, and beneath the bracket, extending parallel with the shelf of bracket 22 and between levers 15 and 16, I mount the coiled spring 23. In order that the spring 23 may be held firmly in position, I employ the collars 24 and 25, keyed to the levers upon which they are mounted, and the coils at the ends of the spring have a footing upon these collars, and the ends of the wire which forms the coil terminate by a final coil about the levers. As thus constructed the normal position of the levers 15 and 16 is a contact with the respective ends of the shelf of bracket 22. Either of these levers may be drawn away laterally in opposite directions from each other and from the shelf, subject to the resisting action of the spring to which the levers are attached. One function of the bracket is to prevent the radial movement of one of these levers, while the opposite lever performs its slight radial movement, another function being to furnish a support for the lengthwise body of the spring.

Rock-bars 1 and 2 when in a normal position are slightly higher than the track-rail and are curved upon their top surfaces, so that the wheels of a car coming upon the track in either direction cause the rock-bars to move downward, and from the description thus far given it is understood that a downward movement of rock-bar 2 will cause a downward movement of arm 9 at its pivotal mounting 27, and this downward movement rotates arm 9 and 9', as is evident, and the rotation or part rotation of arm 9', caused by the downward pressure upon rock-bar 2, will cause a radial movement of lever 16, so that its upper end will move a limited space in a direction laterally away from bracket 22, and the action of the spring 23 will cause it to return to the bracket whenever the pressure has been removed from rock-bar 2, and likewise it will be understood that a downward pressure upon rock-bar 1 will in a similar manner cause lever 15 to move away from the bracket, the movement being in an opposite direction from the movement described by lever 16, and it will be understood that this lever 15 will at once return to a contact with bracket 22 in obedience to the action of spring 23 whenever the pressure upon rock-bar 1 has been removed. The wheel of a car, therefore, in passing over the rock-bars will cause a movement downward of both the levers in alternation, and levers 15 and 16 will move alternately in a corresponding manner.

I provide the collar 28, keyed upon the lever 15, and collar 29, keyed upon lever 16, and upon these collars, respectively, I rigidly mount the indexes 31 and 30.

I rigidly mount the frame 32 within the receptacle in a position opposite the indexes 30 and 31, and upon the frame 32 I pivotally mount the oppositely-disposed contacting levers 33 and 34. The contacting levers are preferably elbow-formed, having an upper and lower arm, as shown in Figs. 7, 8, and 9. The pivotal mounting is near the point of the elbow at 35, and these levers are preferably constructed of wood, or any non-conducting substance will answer the purpose, and upon the upper arm-surface of one lever I provide a metal contacting plate 36, and I also provide a metal contacting surface 37 upon the under portion of the opposite arm. The lower portions of the elbow-levers are provided with spiral springs 38, and indexes 30 and 31 have constant contact with these lower arms, and whenever there is a radial movement of the vertical levers 15 and 16, caused by a downward pressure upon the rock-bars 1 and 2, the upper arms of levers 33 and 34 are thrown forward toward each other, as is evident. The normal position of contacting levers 33 and 34 is shown by Fig. 9, their upper arms extending upon an upward incline, the arms being out of contact. The position at this time of levers 15 and 16 is vertical, the upper ends of these levers resting against the shelf of bracket 22, (shown best by Fig. 5,) and the indexes 30 and 31 are held rigidly upon levers 16 and 15, their outer ends being in contact with the outer and lower portions of contacting levers 33 and 34. If the approaching car comes from a direction to first press upon rock-bar 2, the upper arm of elbow-lever 33 will be pressed forward and downward, and there will be no contact of the metal portions 36 and 37, as shown by Fig. 7; but if the car comes from the opposite direction contacting-lever 34 will be first pressed downward, as is evident, and lever 33 will immediately follow in a downward movement, and the position of the levers will be as shown by Fig. 8, the metal surface 36 being below and in contact with the metal surface 37, and in this manner a metal or electrical contact is made or a non-electrical contact is made at each passage of a car over rock-bars 1 and 2, depending, of course, upon which direction the car or train approaches, and it will be noted that the action of these parts are certain in their movements to effect the contact of either the wood or metal sides of the contacting levers 33 and 34. It will be noted that the action is smooth of these contacting levers, as they are not driven by any force, but as the indexes are drawn apart they have simply a following movement under the contracting force of their springs 38, and no amount of track vibration can cause unusual wear or loosening of these levers. Also levers 15 and 16 are resiliently connected by the spring 23, and the radial movement they are called upon to perform is very slight. The action of these levers is smooth and free from vibration by reason of the collars and platform or bracket 22, already described.

I place the battery 40 and bell 41 at any convenient location and suitably connected, so that the latter is within the circuit of the electrically-energized wires, one of such wires being connected to the lower and the other wire being connected with the upper metal surface of the levers 33 and 34, and from the description of mechanism employed it will be understood that the bell will ring an alarm when a car comes in a manner so that rock-bar 1 is pressed before rock-bar 2. When the car approaches from an opposite direction and first presses rock-bar 2, no alarm will be sounded, as is obvious.

Two complete mechanisms, with gong and bell differing in tone, are used upon opposite portions of the track to indicate the approach of trains from different directions from same station or crossing, and various modifications may be made in the use of the invention.

What I claim as my invention is—

1. An electrical railway-signal comprising a battery, an alarm-bell, two contacting members having electrically-conducting surfaces and non-conducting electrical surfaces, a rock-bar adapted to have a radial movement, and two arms; said arms being radially mounted and making contact with said contacting members; and means to cause a radial movement of said arms from the radial movement of said rock-bar.

2. An electrical railway-signal comprising a battery, an alarm-bell, two pivotally-mounted contacting members having electrically-conducting and electrically non-conducting surfaces, two rock-bars radially mounted upon a track-rail and adapted to have a downward movement thereon; two arms radially mounted and making contact with said contacting members, said arms being adapted to receive a radial movement from the downward movement of said rock-bars.

3. An electrical railway-signal comprising a battery, an alarm-bell, a receptacle having inner and outer walls; two pivotally-mounted contacting members within said receptacle having electrically-conducting and electrically non-conducting surfaces; two rock-bars radially mounted upon a track-rail and adapted to have a downward movement thereon; two arms within the inner walls of the receptacle, said arms being radially mounted and making contact with said contacting members; two substantially horizontally disposed arms upon the outer walls of said receptacle; said substantially horizontally disposed arms being pivotally mounted upon said arms and having an entrance within the receptacle through said walls; and two packing-boxes or their equivalents; said packing-boxes being adapted to make contact with said arms and with the outer walls of said receptacle at the points of said entrance of said arms within said receptacle; said arms within said receptacle being adapted to receive a radial movement while in contact with said pivotally-mounted contacting members from the downward movement of said rock-bars.

4. An electrical railway-signal comprising a battery, an alarm-bell, two radially-mounted contacting members having electrically-conducting and electrically non-conducting surfaces, rock-bars radially mounted upon a track-rail; two arms radially mounted and making contact with said contacting members, said arms being adapted to receive said radial movement from said radial movement of said rock-bars; a spring and a shelf; said spring and shelf being disposed contactingly between said radially-mounted arms; said contacting members being adapted to receive their said radial movement from the said radial movement of said arms; one of said contacting members being adapted to receive its said radial movement from one of said arms at a time when the other of said arms makes a contact with said shelf, substantially as shown and described.

In testimony whereof I affix my signature in presence of two witnesses.

BURTON A. KARR.

Witnesses:
 LORENZ KOENIG,
 ALBERT KODYM.